April 18, 1961 G. C. BRACKEN 2,980,790
WELDING ELECTRODE HOLDERS
Filed Nov. 23, 1959 2 Sheets-Sheet 1
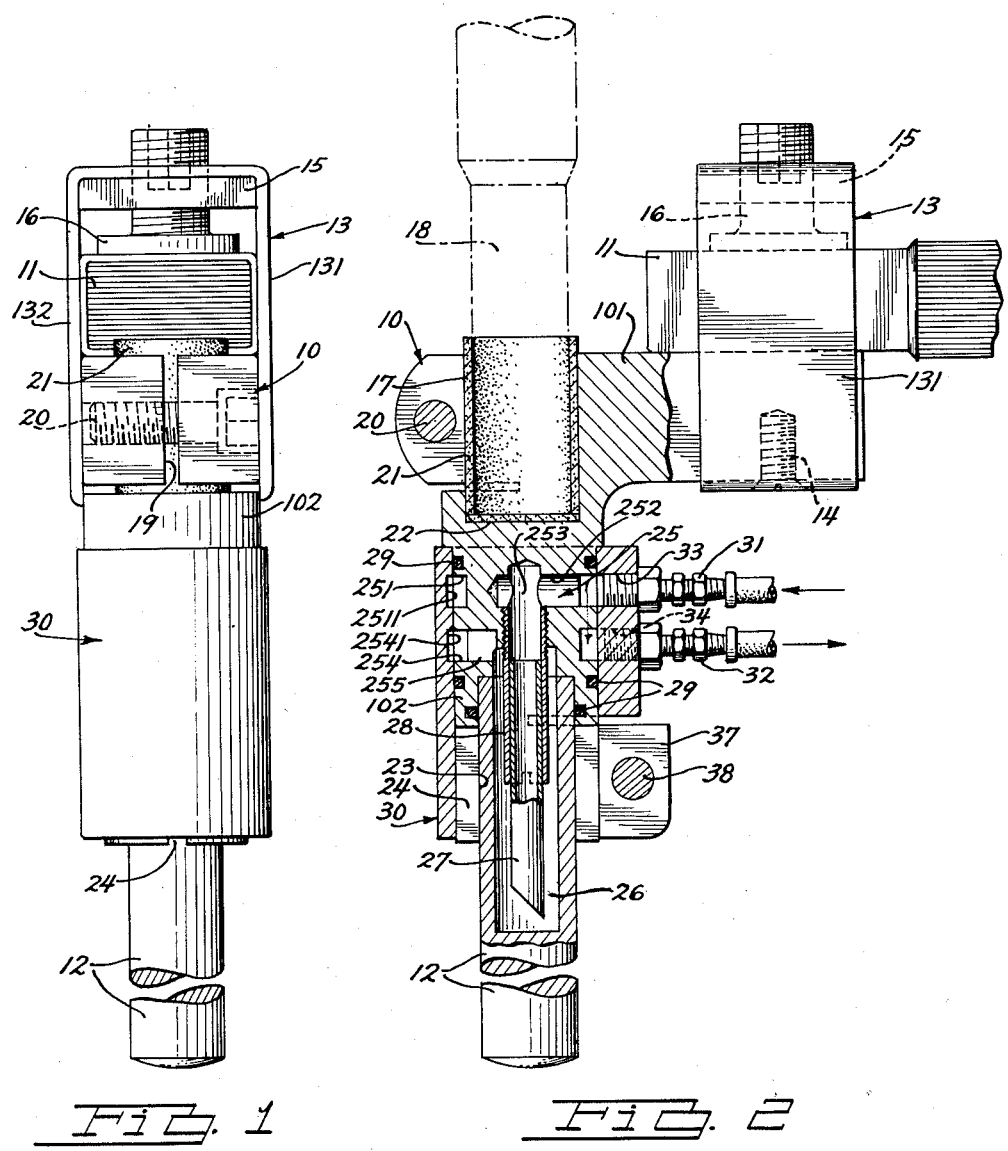
INVENTOR.
GARLAND C. BRACKEN
BY
ATTORNEY April 18, 1961 G. C. BRACKEN 2,980,790
WELDING ELECTRODE HOLDERS
Filed Nov. 23, 1959 2 Sheets-Sheet 2
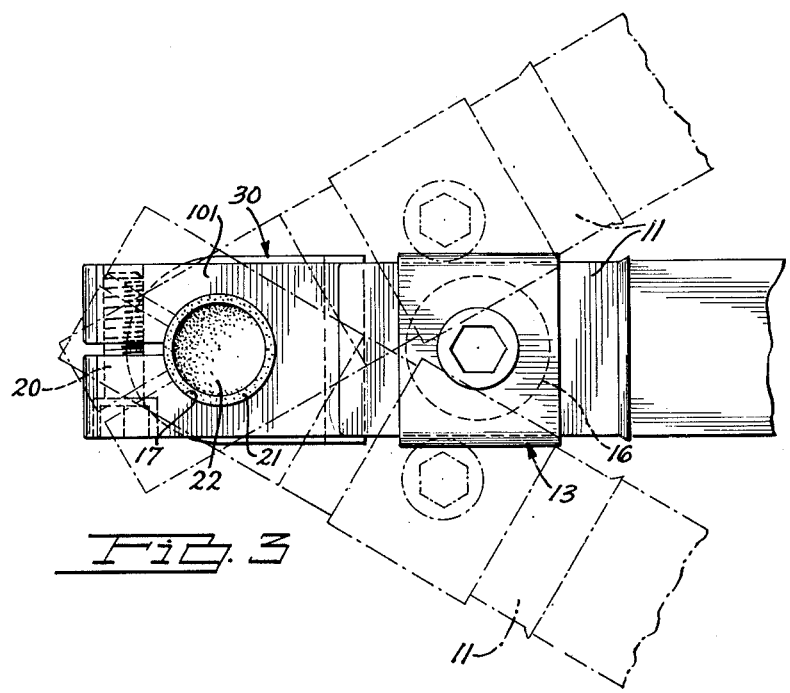
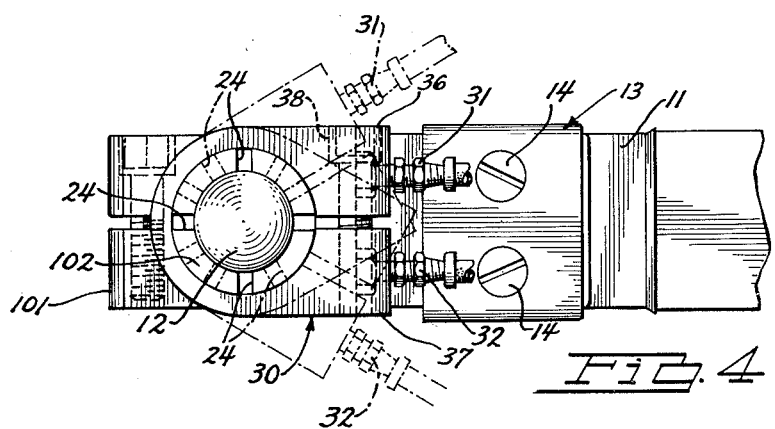
INVENTOR.
GARLAND C. BRACKEN
BY
ATTORNEY United States Patent Office 2,980,790
Patented Apr. 18, 1961

2,980,790

WELDING ELECTRODE HOLDERS

Garland C. Bracken, Dearborn, Mich., assignor to Dollar Electric Co., Madison Heights, Mich., a corporation of Michigan Filed Nov. 23, 1959, Ser. No. 854,625

7 Claims. (Cl. 219—120)

This invention relates to welding electrode holders in general, and more particularly to an electrode holder of simplified construction having freely positionable coolant and terminal lug connections.

It is common for a plurality of individual welding guns to be used together in a single frame for multiple spot welding requirements. In such instances each individual electrode holder normally includes its own coolant and terminal lug connections. Obviously, the orientation and alignment of such connections presents a difficult problem, particularly in closely fitted welding gun conditions.

Heretofore, electrode holders have been proposed which included a separate conducting member and a part for receiving the electrode tip in engagement therewith. In these instances in which the electrode holder was inclusive of coolant passages for electrode cooling purposes, this arrangement necessitated prealignment of the coolant inlet and outlet means connected to the electrode holder prior to its secure engagement to the conducting member. Subsequent rearrangement required loosening the holder from its support, which was extremely cumbersome in the close working conditions that usually existed.

Further factors of dissatisfaction with prior adjustable electrode holders are the generally poor conductivity with multiple piece constructions, the use of tapered shank electrodes, the difficulties of engaging and disengaging the tapered shank electrodes within a holder, the required use of numerous different and special tools for assembly and disassembly, and the generally poor cooling characteristics obtained with fixed coolant passage arrangements.

With the foregoing in view, it is an object of this invention to provide an adjustable welding electrode holder of multi-piece construction having adequate high conductivity.

Another object of the invention is to provide an electrode holder with a freely positionable coolant jacket member for greater freedom in aligning of its coolant connections without relative adjustment of the main cable connection thereto.

Another object of the invention is to provide an electrode holder having both the terminal lug and coolant connections conveniently adjustable with respect to each other.

Another object of the invention is to provide in an adjustable electrode holder simplified and superior electrode engaging means and coolant passage locating means.

Still another object of the invention is to provide an adjustable electrode holder requiring no special adapters or tools for removal of the electrode therefrom, or for the assembly, disassembly or adjustment thereof.

Other objects of the invention will become more apparent by reference to the following detailed description taken in connection with the accompanying drawings, in which:

Fig. 1 is a front elevational view of an electrode holder embodying the invention.

Fig. 2 is a side view of the electrode holder of Fig. 1 with parts broken away to more clearly show the construction.

Fig. 3 is a top plan view of the electrode holder of Figs. 1 and 2 with different positions of the main cable connection thereto shown in phantom outline.

Fig. 4 is a bottom view of the electrode holder of Figs. 1 and 2 with different positions of the coolant jacket and coolant connections shown in phantom outline.

Referring now to the drawings wherein like reference characters refer to like and corresponding parts throughout the several views, the particular embodiment of the invention disclosed for illustrative purposes as shown in Figs. 1 and 2 is a heavy duty welding electrode holder generally designated by the numeral 10. The said welding electrode holder 10 is formed of a high conductivity copper material or the like, and includes a current conductive body portion or element 101 generally rectangular in shape. The free or laterally extended end of the conductive body portion 101 is receptive of the main cable or terminal lug 11. The welding electrode holder 10 also includes an electrode carrier element 102 extended normal to and preferably integral with the conductive body portion 101, which electrode carrier element 102 is receptive of the welding electrode 12.

A bracket member 13 is secured by screw fasteners 14 to the extended end of the conductive body portion 101 and serves as a cable terminal lug connection means. The side walls 131 and 132 of the said bracket member 13 extend up and in spaced relation over the end of the body portion 101. A threaded nut 15 is welded to the bracket member 13 in overhanging relationship to the conductive body portion 101 and has a socket-headed flanged screw 16 engaged therein. The flanged screw 16 is used to clamp the cable terminal lug 11 in secure engagement with the extended end of the conductive body portion 101 of the welding electrode holder 10 with relative ease and simplicity.

A bore or well 17 is formed in the top of the main part of the conductive body portion 101 of the welding electrode holder 10 to receive the supporting or mounting shank 18 which carries the said welding electrode holder 10. The said mounting shank 18 is a part of a welding machine head, not shown, and functions as a pivot post in the adjustment of the radial angular position of the terminal lug connection in respect thereto.

The bored or well end of the conductive body portion 101 is slotted, as at 19, and includes a socket headed clamping screw 20 therethrough. An insulating sleeve 21 and in insulating end plate 22 are disposed in the shank receptive bore 17 of the conductive body portion 101, and, upon receipt of the mounting shank 18 therein, the clamping screw 20 is tightened to secure the welding electrode holder 10 in insulated engagement thereto.

The welding electrode holder 10 has an electrode carrier element 102 which extends normal to the conductive body portion 101 preferably in alignment with the shank receptive bore 17 thereof, and telescopingly receives the electrode 12 as best shown in Fig. 2. The said electrode carrier element 102 is preferably cylindrical in shape and is formed to receive the electrode 12 within an axial bore or opening 23 provided in the lower end thereof. The said electrode carrier element 102 is slotted, as at 24, for clamping engagement of the electrode 12 as will be described later.

Coolant conductive grooves and passages 25 are formed within the electrode carrier element 102 and are in communication with a blind end coolant passage 26 provided within the electrode 12. An inlet groove 251 is formed about the electrode carrier element 102 and a radial passage 252 connects with a central and axially disposed passage 253. The said central axial passage 253 is in open communication with the electrode passage 26 and also with an outlet groove 254 via a passage 255.

A coolant deflector tube 27 is preferably frictionally engaged within a tube adapter 28 threaded in the central coolant passage 253. The deflector tube 27 is extensible relative to the tube adapter 28 so that it may be positioned relatively close to the lower end of the passage 26 for better cooling of the tip of the electrode 12.

The electrode 12 preferably has a straight rather than a tapered shank which preferably abuts against a shoulder provided at the inner end of the axial bore 23 of the electrode carrier element 102.

Sealing rings 29 are disposed on axially opposite sides of the coolant conducting grooves 251 and 254 of the electrode carrier element 102 and in sealing position relative to a sleeve 30 disposed over the outer periphery of the said electrode carrier element 102. A sealing ring 29 is also disposed between the electrode carrier element 102 and the electrode 12 at the axial bore 23 in the said electrode carrier element 102.

The said sleeve 30 which is telescoped over the coolant conducting grooves 251 and 254, and includes complementary grooves 2511 and 2541 therein which register with the said coolant conductive grooves 251 and 254. The sleeve member 30 has inlet and outlet connections 31 and 32 threaded in radial bores 33 and 34 therein to provide means for circulating coolant fluid through the several grooves and passages of the electrode holder 10 and the passage 26 of the electrode 26 to cool the said electrode 12. The sealing rings 29 provide a sufficient fluid seal between the sleeve member 30 and the electrode carrier element 102; however, the said sleeve member 30 may be turned on the electrode carrier element 102, thus permitting the coolant connections 31 and 32 to be oriented in any desired radial position.

The lower end of the sleeve or jacket member 30 is slotted at 35 and includes ears 36 and 37 through which a socket headed screw 38 is provided to tighten the sleeve 30 in any selected position to which it may be turned. The lower slotted end of the said sleeve 30 also serves as a locking collar to fix the electrode 12 within the bore 23 of the electrode carrier element 102.

The welding electrode holder 10 just described is, in effect, a one piece member having a terminal lug receptive portion 101 and an electrode carrier element 102. The electrode holder 10 may be positioned as desired on the electrode holder mounting shank 18 with the terminal lug 11 oriented in any radial direction with respect to the said electrode mounting shank 18. When so positioned, the electrode holder 10 is secured to the said mounting shank by tightening the socket head screw 20.

The sleeve 30 is at all times positionable on the electrode carrier element 102, and it may be turned without disturbing the orientation of terminal lug 11. The coolant sleeve 30 may be locked in any selected position to which it may be turned by means of the socket screw 38, thus fixing the coolant connections 31 and 32 in any desired radial direction to which they may be turned.

The electrode 12 is easily assembled and disassembled from the electrode holder 10 by means of the said locking socket screw 38. Further, in the course of such assembly the coolant deflector tube 27 is readily telescoped to a suitable axial position in the electrode carrier element 102 to provide a maximum conduction of coolant to the lower end of the electrode 12.

The only tool required for the assembly and mounting of the herein disclosed electrode holder 10 on a mounting shank 18 of a welding machine head and the orientation of the electric and coolant connections thereof is a single Allen wrench which fits all of the socket head screws 16, 20 and 38.

Although a single embodiment of the invention has been disclosed and described herein, it is obvious that many changes may be made in the size, shape, arrangement and detail of the various elements of the invention, all without departing from the spirit and scope thereof as defined by the appended claims.

I claim:

1. A welding electrode holder comprising a current conductive body portion including means of terminal lug engagement provided at one end thereof, means of pivotal support provided at the other end of said conductive member, an electrode carrier element formed integral with said conductive body portion and disposed in axial alignment with said means of pivotal support, and a rotatable coolant jacket means including coolant inlet and outlet means extending radially therefrom sleeved on said electrode carrier element turnable in respect thereto, and means fixing said terminal lug engagement means and said coolant jacket means in any position to which they may be turned.

2. A welding electrode holder comprising a current conductive body portion including means of terminal lug engagement provided at one end thereof, means of pivotal support provided at the other end of said conductive member, an electrode carrier element formed integral with said current conductive body portion and disposed in axial alignment with said means of pivotal support, said electrode carrier element having coolant conductive passages provided therewithin, a coolant jacket member turnably sleeved on said electrode carrier element including coolant conductive inlet and outlet connections in continuous communication with said coolant conductive passages, and means fixing each of said terminal lug engagement means and said coolant jacket in any position to which they may be oriented about the axis of said means of pivotal support.

3. A welding electrode holder comprising a current conductive body portion including means of terminal lug engagement provided at one end thereof, means of pivotal support provided at the other end of said conductive body portion, an electrode carrier element formed integral with said conductive body portion and disposed in axial alignment with said means of pivotal support, said electrode carrier element having therein and about coolant conductive grooves and passages in communication with an electrode received therein, and a sleeve disposed in turnable engagement with said electrode carrier element including coolant inlet and outlet connections disposed in coolant sealed engagement relative to the coolant conductive grooves and passages of said electrode carrier element, means fixing said conductive body portion to any position it may be pivoted about its means of pivotal support, and means fixing said sleeve in any position it may be turned about said electrode carrier element.

4. A welding electrode holder comprising a current conductive body portion having an aperture provided therein receptive of a pivot post, an extension of said current conductive body portion disposed radially of said receptive aperture and including means of retaining a cable terminal lug near the extended end thereof, a second extension element of said current conductive member disposed normal to said first mentioned extension and including an electrode receptive aperture in the extended end thereof, said second extension element having coolant grooves and passages provided therein, and a coolant jacket sleeve member turnably mounted around said second extension element including coolant conductive connections positionable with said sleeve in continuous coolant conductive engagement with said coolant grooves and passages in said second extension element.

5. A welding electrode holder comprising an electrode carrier element having a slotted aperture provided in opposite ends thereof, one slotted end being adapted to receive an electrode and the other slotted end being receptive of a pivot post of a welding machine head, said electrode carrier element having coolant passages therein, a radially disposed extension of said electrode carrier element including means of terminal lug engagement near the extended end thereof, complementary socket head screw means for removably engaging and securing said electrode tip, said pivot post and said terminal lug to said electrode carrier element, and a turnable coolant inlet and outlet sleeve turnably mounted on said electrode carrier element at the electrode receptive end thereof and formed for coolant conductive cooperation with the coolant passages in said electrode carrier element.

6. A welding electrode holder comprising a current conductive body portion including an electrode carrier element and a cable terminal lug connector means, an electrode tip received within said electrode carrier element having a blind end coolant passage therein, the said electrode carrier element having coolant passages therein and including an extensible conduit directing coolant to the blind end coolant passage of said electrode tip passage, and a turnable coolant jacket sleeve on said electrode carrier element including coolant inlet and outlet connections in coolant conductive cooperation with the coolant passages of said electrode carrier element and said electrode tip.

7. A welding electrode holder for straight shank electrodes comprising a current conductive body portion including a terminal lug receptive element and an electrode carrier element formed integral therewith, a slotted aperture provided within said electrode carrier element, said straight shank electrode being received within said slotted aperture, said electrode carrier element and said electrode tip having communicating coolant conductive passages provided therewithin, an extensible coolant conductive conduit provided within said electrode carrier element for coolant conduction to the end of said electrode, a turnable sleeve mounted on said electrode carrier element having therein coolant inlet and outlet means communicating with said coolant conductive passages in said electrode carrier element, and means provided on said sleeve for securing said sleeve in any selected position to which it may be turned and said electrode within said electrode carrier element.

References Cited in the file of this patent

UNITED STATES PATENTS

| | | |
|---|---|---|
| 1,221,958 | Bernard | Apr. 10, 1917 |
| 2,683,206 | Day et al. | July 6, 1954 |

FOREIGN PATENTS

| | | |
|---|---|---|
| 689,403 | Great Britain | Mar. 25, 1953 |